(12) United States Patent  
Kopf et al.

(10) Patent No.: US 11,961,201 B2  
(45) Date of Patent: Apr. 16, 2024

(54) VIEWING 3D PHOTO GALLERIES IN VR

(71) Applicant: META PLATFORMS TECHNOLOGIES, LLC, Menlo Park, CA (US)

(72) Inventors: Johannes Peter Kopf, Medina, WA (US); Xuejian Rong, Seattle, WA (US); Tuotuo Li, Seattle, WA (US); Ocean Quigley, Oakland, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/688,555

(22) Filed: Mar. 7, 2022

(65) Prior Publication Data

US 2022/0383602 A1 Dec. 1, 2022

Related U.S. Application Data

(60) Provisional application No. 63/191,771, filed on May 21, 2021.

(51) Int. Cl.
  *G06T 19/20* (2011.01)
  *G06T 7/70* (2017.01)

(52) U.S. Cl.
  CPC .............. *G06T 19/20* (2013.01); *G06T 7/70* (2017.01)

(58) Field of Classification Search
  CPC . G06T 19/20; G06T 7/70; G06F 3/011; G06F 3/012; G06F 3/013; G06F 3/04815; G06F 3/0482; G06F 3/04845
  See application file for complete search history.

(56) References Cited

U.S. PATENT DOCUMENTS

2017/0329488 A1* 11/2017 Welker ................ G06F 3/04842  
2020/0388051 A1* 12/2020 Lin ......................... G06F 3/017

OTHER PUBLICATIONS

Cha S., et al., "Enhanced Interactive 360° Viewing via Automatic Guidance," ACM Transactions on Graphics, May 2020, vol. 39, No. 5, Article 154, pp. 154:1-154:15.

Flynn J., et al., "DeepStereo: Learning to Predict New Views from the World's Imagery," Conference on Computer Vision and Pattern Recognition, 2016, 5515-5524.

(Continued)

*Primary Examiner* — Chong Wu  
(74) *Attorney, Agent, or Firm* — Potomac Law Group, PLLC; Dannon G. Allbee

(57) ABSTRACT

In one embodiment, a method includes accessing multiple 3D photos to be concurrently displayed through multiple frames positioned in a virtual space, each of the of 3D photos having an optimal viewing point in the virtual space and determining a reference point based on a head pose of a viewer within the virtual space. The method may further include adjusting each 3D photo by rotating the 3D photo so that the optimal viewing point of the 3D photo points at the reference point, translating the rotated 3D photo toward the reference point, and non-uniformly scaling the rotated and translated 3D photo based on a scaling factor determined using the reference point and a position of the frame through which the 3D photo is to be viewed. The method may further include rendering an image comprising the adjusted multiple 3D photos as seen through the multiple frames.

20 Claims, 10 Drawing Sheets

(56) References Cited

OTHER PUBLICATIONS

Flynn J., et al., "DeepView: View Synthesis with Learned Gradient Descent," Proceedings of the IEEE Conference on Computer Vision and Pattern Recognition (CVPR), 2019, 2367-2376.

Godard C., et al., "Digging into Self-Supervised Monocular Depth Estimation," Proceedings of the IEEE/CVF International Conference on Computer Vision (ICCV), 2019, pp. 3828-3838.

Hedman P., et al., "Casual 3D Photography," ACM Transactions on Graphics, Nov. 2017, vol. 36 (6), Article 234, pp. 1-15.

Hedman P., et al., "Instant 3D Photography," ACM Transactions on Graphics, Aug. 2018, vol. 37 (4), Article 101, pp. 1-12.

Horry Y., et al., "Tour into the Picture: Using a Spidery Mesh Interface to Make Animation from a Single Image," In Proceedings of the 24th Annual Conference on Computer Graphics and Interactive Techniques, (SIGGRAPH '97), 1997, pp. 225-232.

Kongsilp S., et al., "Motion Parallax from Head Movement Enhances Stereoscopic Displays by Improving Presence and Decreasing Visual Fatigue," Displays 49, 2017, pp. 72-79.

Kopf J., et al., "One Shot 3D Photography," ACM Transactions on Graphics (Proc. SIGGRAPH), 2020, vol. 39, No. 4, pp. 76:1-76:13.

Li Z., et al., "Learning the Depths of Moving People by Watching Frozen People," Proceedings of the IEEE/CVF Conference on Computer Vision and Pattern Recognition (CVPR), 2019, pp. 4521-4530.

Li Z., et al., "Megadepth: Learning Single-view Depth Prediction from Internet Photos," Proceedings of the IEEE Conference on Computer Vision and Pattern Recognition (CVPR), 2018, pp. 2041-2050.

Liu M., et al., "Geometry-Aware Deep Network for Single-Image Novel View Synthesis." IEEE Conference on Computer Vision and Pattern Recognition (CVPR), 2018, pp. 4616-4624.

Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.

Niklaus S., et al., "3D Ken Burns Effect from a Single Image," ACM Transactions on Graphics (Proc. SIGGRAPH Asia), 2019, vol. 38, No. 6, Article. 184, pp. 1-15.

Oh B.M., et al., "Image-Based Modeling and Photo Editing," In Proceedings of the 28th annual conference on Computer graphics and interactive techniques, 2001, pp. 433-442.

Park J.J., et al., "DeepSDF: Learning Continuous Signed Distance Functions for Shape Representation," Computer Vision and Pattern Recognition (CVPR), 2019, pp. 165-174.

Pavel A., et al., "Shot Orientation Controls for Interactive Cinematography with 360 Video," Proceedings of the 30th Annual ACM Symposium on User Interface Software and Technology, 2017, pp. 289-297.

Ranftl R., et al., "Towards Robust Monocular Depth Estimation: Mixing Datasets for Zero-Shot Cross-dataset Transfer," arXiv preprint arXiv:1907.01341, 2019, 20 pages.

Ranftl R., et al., "Vision Transformers for Dense Prediction," arXiv preprint arXiv:2103.13413, 2021, 15 pages.

Saito S., et al., "PIFu: Pixel-Aligned Implicit Function for High-Resolution Clothed Human Digitization," International Conference on Computer Vision (ICCV), 2019, pp. 2304-2314.

Serrano A., et al., "Movie Editing and Cognitive Event Segmentation in Virtual Reality Video," ACM Transactions on Graphics, vol. 36, No. 4, Article 47, 2017, pp. 47:1-47:12.

Shade J., et al., "Layered Depth Images," ACM, SIGGRAPH '98: Proceedings of the 25th Annual Conference on Computer graphics and Interactive Techniques, Jul. 1998, 12 pages.

Shih M-L., et al., "3D Photography using Context-Aware Layered Depth Inpainting," Computer Vision and Pattern Recognition (CVPR), 2020, pp. 8028-8038.

Sitzmann V., et al., "Deepvoxels: Learning Persistent 3d Feature Embeddings," Proceedings of the IEEE!CVF Conference on Computer Vision and Pattern Recognition, 2019, pp. 2437-2446.

Srinivasan P.P., et al., "Learning to Synthesize a 4D RGBD Light Field From a Single Image," IEEE International Conference on Computer Vision (ICCV), 2017, pp. 2262-2270.

Srinivasan P.P., et al., "Pushing the Boundaries of View Extrapolation with Multiplane Images," Computer Vision and Pattern Recognition (CVPR), 2019, pp. 175-184.

Su Y., et al., "Pano2Vid: Automatic Cinematography for Watching 360° Videos," Proceedings of the Asian Conference on Computer Vision (ACCV), 2016, 21 pages.

Tucker R., et al., "Single-View View Synthesis with Multiplane Images," Computer Vision and Pattern Recognition (CVPR), 2020, pp. 551-560.

Wiles O., et al., "SynSin: End-to-End View Synthesis From a Single Image," Computer Vision and Pattern Recognition (CVPR), 2020, pp. 7467-7477.

Zhou T., et al., "Stereo Magnification: Learning View Synthesis using Multiplane Images," ACM Transactions Graph, Aug. 2018, vol. 37 (4), Article 65, pp. 65:1-65:12.

* cited by examiner

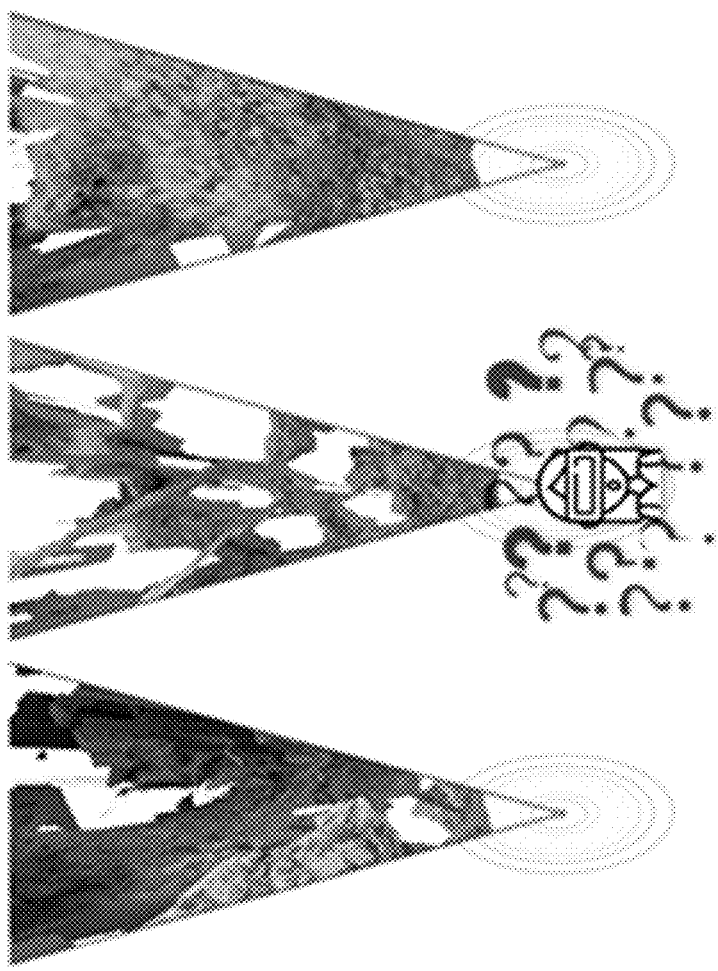
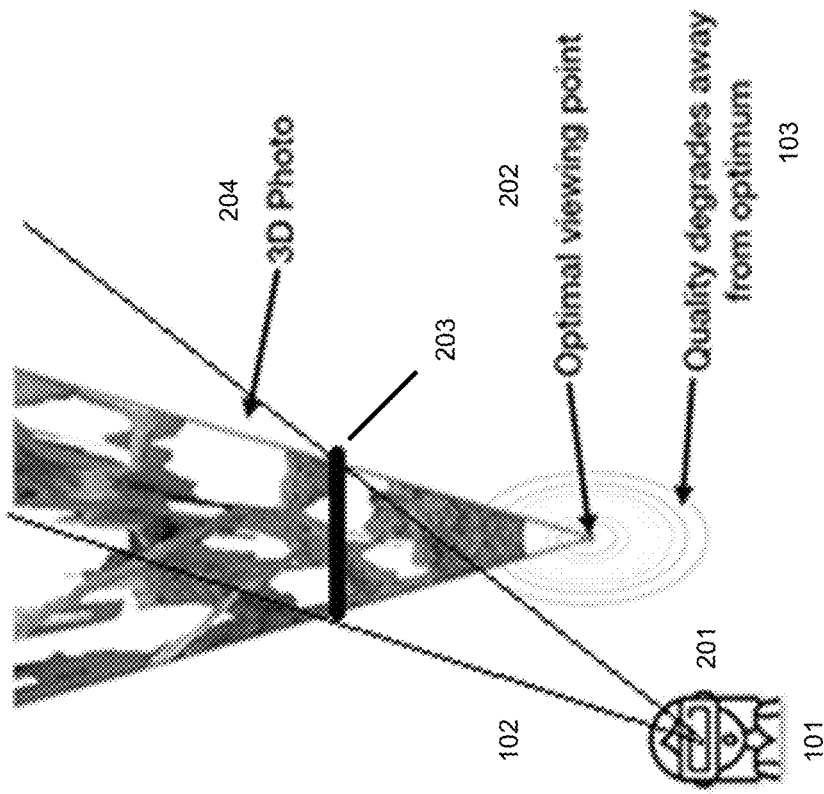
FIG. 1b
FIG. 1a

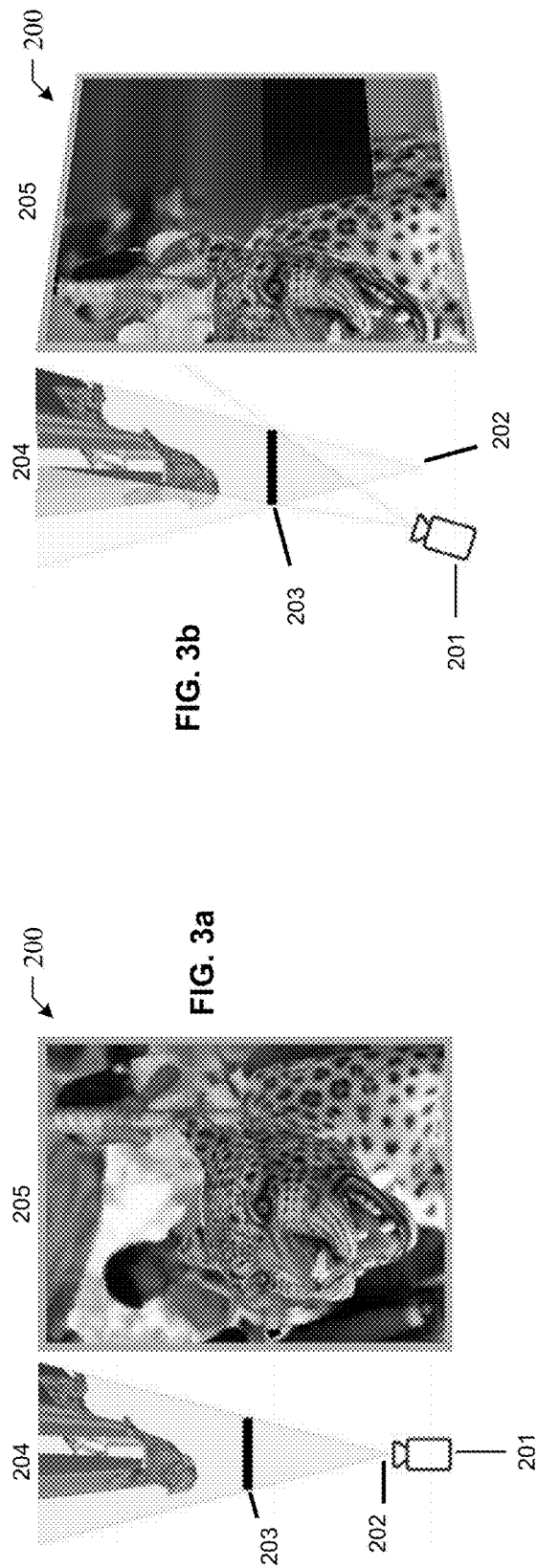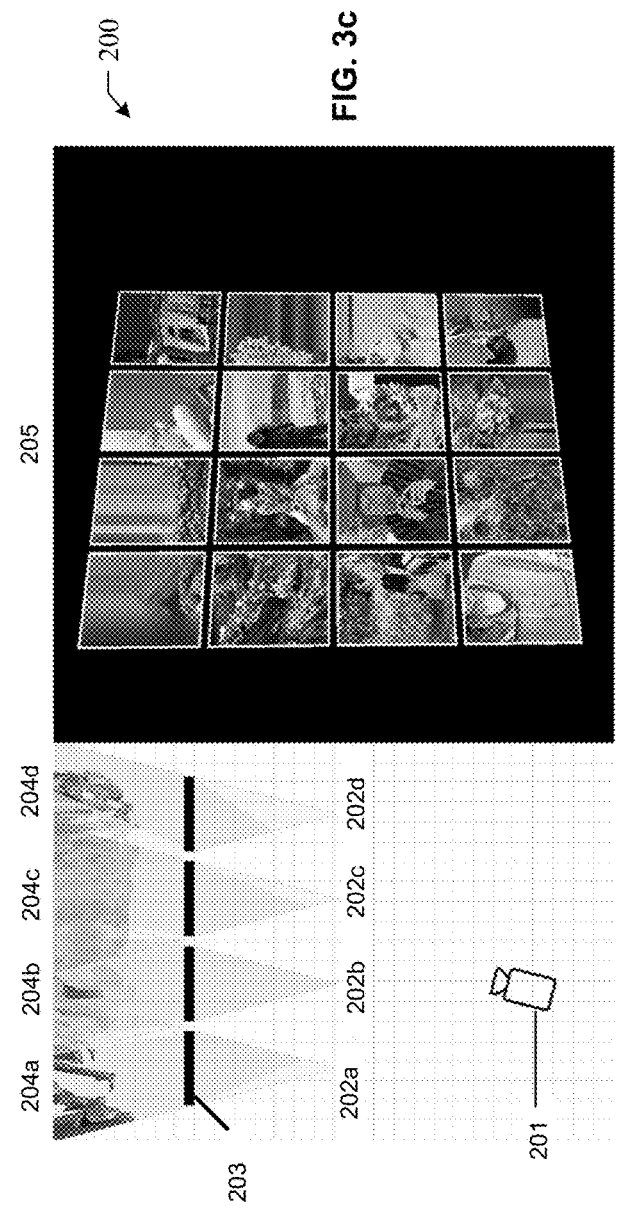

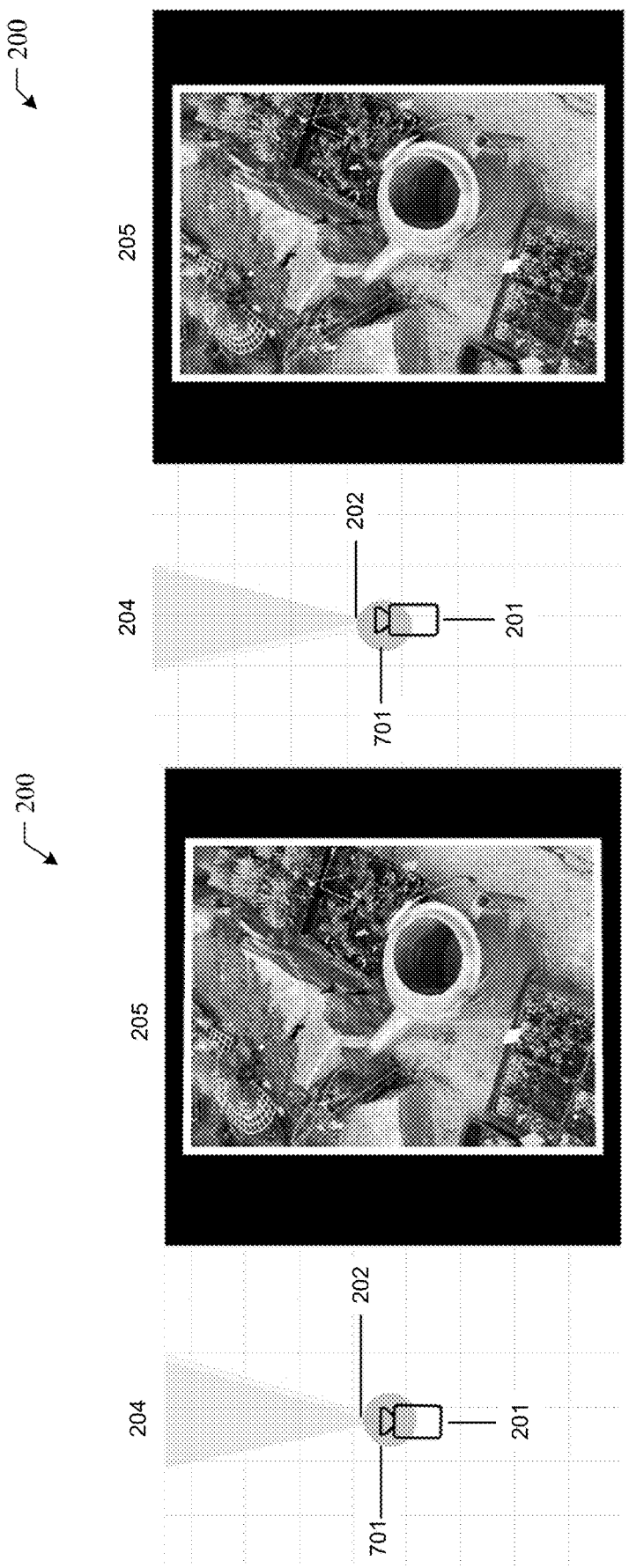

VIEWING 3D PHOTO GALLERIES IN VR

PRIORITY

This application claims the benefit under 35 U.S.C. § 119(e) of U.S. Provisional Patent Application No. 63/191,771, filed 21 May 2021, which is incorporated herein by reference.

TECHNICAL FIELD

This disclosure generally relates to methods enabling the creation of 3D photo galleries in VR with arbitrary layouts.

BACKGROUND

Virtual reality (VR) is an exciting new technology that enables people to experience life-like immersion into virtual environments. VR headsets provide separate images for each eye for stereographic display (stereopsis) as well as real-time positional and rotational head tracking for instant visual feedback (motion parallax). The combination of both of these 3D cues may be critical for achieving a high degree of presence in the environment as well as low visual fatigue.

One obstacle in the growth of VR is the fact that the available content that people can enjoy today is rather limited. Common use cases include gaming and watching 360° videos. Almost all content that is currently available in VR is created by professional artists and producers. There is almost no user-generated photographic content in VR. This is because up until a short while ago, there was no easy way for ordinary people to capture true 3D content that can be rendered from novel viewpoints to enable stereopsis and motion parallax, as 3D content was often recorded with expensive professional capturing devices. This has recently changed, however. Stereo cameras have become popular on mobile phones, and, more importantly, a variety of new techniques now supports converting a single 2D monoscopic red-green blue (RGB) photo into certain types of 3D representations that can be interactively rendered from novel viewpoints. 3D photo technology has become a fairly common feature available in various image capturing applications. In essence, 3D photo technology takes the subject in the foreground, measures it compared to objects in the background, and uses this data to create the perception of depth.

While the creation of user-generated 3D content seems well addressed now, there has been little discussion on proper presentation of these results. It follows that building technology that enables people to view and share their 3D photos in a compelling way that makes full use of the VR medium may be crucial for getting more people excited about VR.

SUMMARY OF PARTICULAR EMBODIMENTS

This work addresses the presentation of single-photo view synthesis results, which may collectively be referred to as "3D photos", in Virtual Reality (VR). These methods have in common that their results may be best viewed from a specific viewing region. The quality may be best when the novel viewpoint is near the point of capture, but it degrades away from that point. In multi-photo experiences, such as a browsable photo feed, this may cause the problem that every photo has its individual optimal viewing region, and the viewer may not simultaneously occupy them. We propose a new technique that resolves this issue. Specifically, each 3D photo is placed behind a planar frame that can be arbitrarily positioned and oriented in 3D space. The photos automatically rotate, translate, non-uniformly scale, and adapt to specified interpupillary distance in order to move the optimal viewing point so it tracks the current position of viewer and reduces quality degradation. We achieve motion parallax using hysteresis, which is designed so it provides stability for small user motion as well as strictly limited distortion for larger user motion. The method enables creating 3D photo galleries in VR with arbitrary layouts. It may also provide viewing with full stereoscopic parallax as well as motion parallax and strict quality guarantees.

The classic way to create 3D images may involve carefully annotating the depth of a picture manually, or semi-manually with the help of tools. More recent approaches usually build upon learning-based single-view depth estimation models and different geometric representation designs which ease the novel view synthesis and rendering. Here we review the recent popular approaches that enable generating certain types of 3D photography from a single RGB image, which include depth estimation models for geometric reasoning, and popular geometric representations that benefit the novel view synthesis.

For enabling 3D photography from single 2D captures, most related research areas to this direction are single view depth prediction and novel view synthesis. There has been great interest in predicting a depth map from a single RGB image. The proposed methods usually build with high capacity deep models for in principle operating on a fairly wide and unconstrained range of scenes. The trained data are usually diverse and may span a wide range of conditions, from indoor to outdoor, static to dynamic scenes, single image to consecutive video frames, sparsely or densely annotated depth maps, casual online videos to professional 3D movies. Related research may have proposed to utilize video frames with apparent motion for self-supervised monocular training and may have adopted structure-from-motion (SfM) and multi-view stereo (MVS) to reconstruct predominantly static 3D scenes as supervision signals. It may have also used SfM and MVS to construct a dataset from videos of people imitating mannequins and proposed to train with a controlled mixing of multiple data sources and apply vision transformers on dense depth prediction.

After obtaining dense depth information, the integrated RGB Depth pair may already provide an essential 2.5D viewing capability which approximates "3D photography". However, depth maps alone may not enable full synthesis of new views, due to the occluded contents that are only visible in desired target views, even if many recent self-supervised depth prediction models use video synthesis as an implicit supervision signal. Therefore the results may not be visually pleasant enough. To tackle this problem, may be to start from the single-view depth prediction results, with inpainting content behind the visible surfaces to enable high-quality single-image view synthesis, though requiring dense and accurate depth supervision and multi-stage post-processing. Meanwhile, other research work proposed to employ more advanced geometric representations to alleviate this issue and further enhance the quality of inferred geometric information.

Besides depth maps, it may also be considerably popular to directly predict suitable geometric representation from single images. For instance, one may predict a set of homography warps, and a selection map to combine the candidate images to a novel view. It employs complex networks at runtime, leading to slow synthesis. Another may predict a full 4D light field representation from a single view. These methods have not been demonstrated to be generalizable to more diverse set yet. Other works may use an end-to-end trained GAN (generative adversarial network) model with a differentiable point cloud renderer for self-supervised pairwise training. Then in inference, a single image of an unseen scene may feed to the model from which new views are generated. Recently, various neural rendering based implicit representations may also provide compelling realism in synthesized novel views, especially for various follow-up work after the emerging of NeRF (Neural Radiance Fields). One of the drawbacks may have been the relatively slow training and inference speed of models.

Among various geometric representations that are potentially practical for demonstrating 3D photography, layered representations including layered depth image (LDI) and multiplane image (MPI) may be particularly attractive and popular lately, due to their ability to represent occluded content. LDI may have been leveraged for 3D photography generation, which consists of a regular rectangular lattice with integer coordinates, just like a normal image; but every position may hold zero, one, or more pixels. Every LDI-pixel may store a color and a depth value. Other works further improved the general quality of synthesized 3D photos with context-aware layered depth inpainting. MPI, first proposed in Stereo Magnification, has also worked as an effective representation for various tasks as a stack of fronto-parallel planes with RGB textures. While also expressive, it may be relatively more resource-intensive than LDI, with higher data redundancy.

LDI representations may be a good fit for the prototyping goals since it is easy-to-use for background expansion and inpainting, and further lend themselves for conversion into a textured triangle mesh for final content delivery and rendering in mobile VR devices. Practically, the embedded depth information in metadata of photos may be utilized, or dense depth maps predicted by a single-image depth prediction model trained with large-scale diverse data, in LDI generation, and also follow the settings to inpaint occluded LDI pixels for more pleasant visual quality. Though utilizing LDI as the main medium for 3D photography generation maybe the focus, the proposed algorithms may not be limited to certain types of geometric representations and will theoretically fit well with various kinds of "3D Photography".

Immersive content creation and corresponding user interaction design have a long history in computer graphics and human-computer interaction, and are becoming increasingly significant after VR devices have been more popular in the mass market. Review of the recent advances on the utilization of VR devices may be helpful to provide a better context and motivation explanation for our proposed viewing technique.

At the consumer level, there exist a variety of VR based types of content available for end users to enjoy. However, most of the non-gaming content are directly taken from non-VR scenarios, which are 2D and not able to provide enough immersion. For the content specifically produced for VR, such as monoscopic or stereoscopic 360 photos and videos, they usually only provide 3 degree-of-freedom (DOF) of viewing experience, lacking support for motion parallax which might cause motion sickness. Here, the aim may be to provide 6-DOF viewing experiences for the converted user generated content (UGC), starting with 3D galleries derived from 2D single RGB photos.

While not much exploration has been conducted on how multiple 3D photos should be optimized for viewing in 6-DOF VR, there have been advances of research investigation on interactively viewing 360° cinematography. For example, such advancement may be an automatic guidance approach for enhanced interactive 360° playback, which automatically rotates the virtual camera during viewing to guide the viewer through the most important regions of the video. This may mitigate the burden on the user to actively find important events. Other advancements may have analyzed the viewer's head and gaze rotations to incorporate the cinematography and narrative of VR content and others may have utilized cinematography such as zoom to obtain narrow field of view (NFoV) videos from a 360° video. Recent advancements may have introduced a convenient interaction interface that can help the viewer watch an important scene in a 360° video. To further VR viewing experiences, the intent may be to reduce the efforts of the user to find the optimal viewing region for individual 3D photos, so users may get the best viewing experience on large collections with ease.

When building such tools for sharing 3D photos, one may need to consider a key difference between 3D photos and general 3D objects: the former may inherently be made for viewing from a narrow region of viewing points. The optimal viewing point coincides with the point of capture, where we will achieve a perfect reproduction of the input image. Near that point the 3D photo looks good, but the quality degrades away from it for a variety of reasons: (1) it is difficult to extrapolate unseen content from a single image, (2) depth errors amplify proportionally to the camera baseline, and (3) various representations, such as multi-plane images, are designed for a specific viewing angles.

As long as only a single 3D photo is shown at a time, the problem can be mitigated by centering the viewer at the optimal viewing point. However, this solution may break down when the aim is to create a multi-photo viewing experience, because each photo may have a different optimal viewing point and the viewer may not be able to simultaneously occupy all of them. An example for such an application is a social photo feed. A technique that resolves this issue is proposed and enables building large 3D photos galleries in VR that can be scrolled through.

Basic elements of the galleries are frames that act like floating windows, through each of which we can see a photo. A frame itself is a flat rectangle that can be positioned, oriented, and moved in an arbitrary way in 3D space. A new algorithm called pivoting is introduced that may allow for independently controlling the optimal viewing point of each frame's 3D photo, by rotating, translating, and non-uniformly scaling it in a specific way, primarily for being self-adaptive to user movements. Pivoting may alleviate the degradations described above by letting the optimal viewing point track the current viewer location. At the same time, a carefully designed hysteresis is used to provide natural motion-parallax behavior: for small head motions, the 3D photo does not respond at all, and for larger motions, (e.g., when scrolling) its response is delayed. Rendering quality may be guaranteed by limiting the maximum amount of positional and rotational deviation from the optimal viewing point.

To summarize, the technique may enable the creation of VR galleries with arbitrary arrangements of 3D photos and may have the following properties: (1) 3D photos may be rendered with full stereopsis; (2) They may respond and adapt to user's motion, and provide comfortable head motion parallax; (3) There may be strict quality guarantees by limiting distortions.

The embodiments disclosed herein are only examples, and the scope of this disclosure is not limited to them.

Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 1a-1b illustrate the example difficulties in presenting 3D photos in VR

FIGS. 3a-3c illustrate how 3D photos are meant to be viewed from a near optimal viewpoint (OVP).

FIGS. 7a-7b illustrate the dead zone around the viewpoint.

DESCRIPTION OF EXAMPLE EMBODIMENTS

Figure 2C:
FIGS. 2a-2c illustrate examples of viewing flat 2D photos, regular 3D photos, and pivoting 3D photos in VR photo galleries.

A goal of this invention may be to enable creating large 3D photo galleries in VR. A basic element of a gallery are frames, each of which may act like a window through which a single 3D photo can be seen. A 3D photo itself can be thought of and visualized as a frustum where the capture point is at the tip.

FIGS. 1a-1b illustrate the example difficulties in presenting 3D photos in VR. FIG. 1a may illustrate a single 3D photo VR viewing experience which may comprise of a 3D photo 204 which may be displayed through a frame 203. In particular embodiments, a viewer 101 may view the 3D photo 204 through the frame 203 from a particular viewing point 201 and the viewer 101 will have a particular view 102 of the 3D photo 204. As an example and not by way of limitation, an issue with viewing 3D photos in VR is that they may only look good from a narrow region around their capture point (i.e., the frustum tip). This point may be referred to as the optimal viewing point (OVP) 202 in the virtual space. A rendered view from this position may yield a perfect reproduction of the input image but at positions away from the optimum 103 the quality may degrade rapidly. In a single-photo experience, this issue may be worked around by centering the viewer 101 in the OVP 202. However, in a multiphoto gallery which may be illustrated in each photo has a different OVP 202 and the viewer may not simultaneously occupy them. FIG. 1b may illustrate an example which highlights the difficulties of viewing a plurality of 3D photos at once.

A 3D photo 204 may be represented by using the position of its capture point p and orientation, $R=[r^{right}|r^{up}|-r^{forward}]$ represented as rotation matrix. Further, $\theta^x, \theta^y$ is its horizontal and vertical field-of-view, respectively. Note, that most 3D photo creation methods may "outpaint" the exterior a bit, i.e., hallucinate some padding content on the sides, to avoid showing gaps when the view is off the OVP. $\theta$ may only include the original image content and not this extra padding.

A planar frame 203 may be represented by using its center position $f_p$, orientation $f_R$, and horizontal and vertical extent $f_s^x, f_s^y$. The frame 203 can be placed in any position and orientation in 3D space so to create galleries with arbitrary arrangements of 3D photos 204, such as grids or tubular layouts.

When fitting a 3D photo 204 to its Frame, the position of a 3D photo may be computed so that when viewed from its OVP 202 the frame 203 may encompasses the content tightly: and $$R = f_R, \quad (1)$$

$$p = f_p - \underbrace{f_R[0, 0, -1]^T}_{\text{Forward direction}} \cdot d_{fit}, \quad (2)$$

where $$d_{fit} = \max\left(\frac{f_3^x}{w^x}, \frac{f_3^y}{w^y}\right), \quad (3)$$

and $$w^* = \tan\left(\frac{1}{2}\theta^*\right).$$

Note, that this position may be a bit set back from the frame.

To create the illusion of a window, each 3D photo maybe clipped at its frame. This may be implemented by testing against clipping planes in the shader. For example, may cp represent the viewer position, and may $f_c^i$, with i=1 . . . 4, be the four corners of the frame. Then a clipping hyperplane may be defined (n, d) for each side of the frame, $$n = (f_0^i - c_p) \times (f_c^{i+1} - c_p), \quad (4)$$

$$d = c_p \cdot n, \quad (5)$$

and discard any world-space point w that does not pass the plane test w·n'd<0.

Figure 2B:
Figure 2A:

FIGS. 2a-2c illustrate examples of viewing flat 2D photos, regular 3D photos, and pivoting 3D photos in VR photo galleries. FIG. 2a illustrates an example 2D photos gallery which may contain a plurality of 3D photos in VR. The 2D photos may appear flat and may not leverage VR's capabilities. They may be better viewed on other devices. FIG. 2b illustrates an example regular 3D photo VR photo gallery.

3D photos may be immersive in VR but may only look good from a specific viewing region. The viewer may not simultaneously be able to occupy the optimal viewing region of all the photos here, so the quality of most of the photos may appear degraded. FIG. 2c illustrates an example pivoting 3D photo gallery. The proposed pivoting mechanism independently transforms each 3D photo so that they are always seen from a near optimal viewing position.

FIGS. 3a-3c illustrate how 3D photos are meant to be viewed from a near optimal viewpoint (OVP). FIG. 3a illustrates an example VR 3D photo viewing experience 200 where the viewpoint 201 is near the OVP 202. In particular embodiments, when the viewpoint 201 is at or substantially at the OVP 202, the image 205 seen by the viewer may be clear and a perfect or near perfect reproduction of the input image. FIG. 3b illustrates an example VR 3D photo viewing experience 200 where the viewpoint 201 is away from the OVP 202. In particular embodiments, when the viewpoint 201 is substantially away from the OVP 202, the image 205 seen by the viewer is of degraded quality. FIG. 3c illustrates an example VR 3D photo viewing experience 200 where there is a plurality of 3D photos 204a-d. The plurality of 3D photos 204a-d may also be considered a multiphoto gallery. In particular embodiments, each 3D photo 204 of the plurality of 3D photos 204a-d may each have their own optimal viewing points 202a-d and the viewer with a viewpoint 201 cannot simultaneously occupy the multiple optical viewing points 202a-d. As an example and not by way of limitation, optimal viewing point 202a-d of each of the plurality of 3D photos 204a-d is defined based on a location and an orientation of the 3D photo in the virtual space and a point of capture of the 3D photo. As further example and not by way of limitation, each 3D photo 204 of the plurality of 3D photos 204a-d has a different optimal viewing point 202a-d in the virtual space.

Figure 4B:
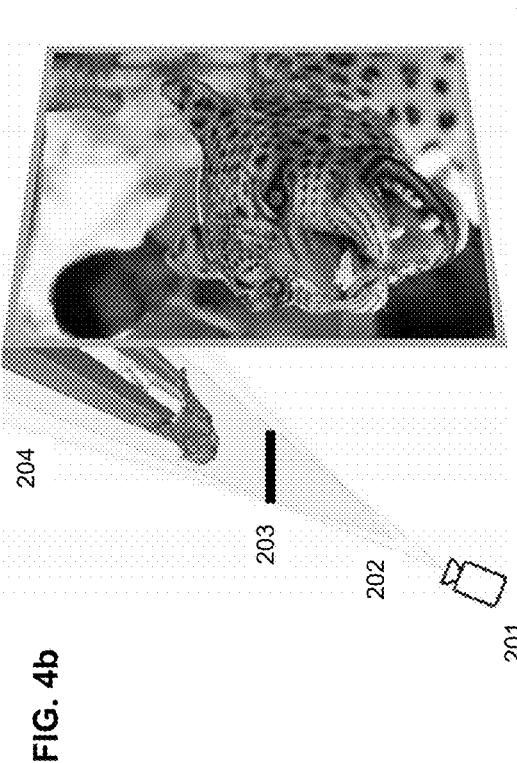
FIGS. 4a-4d illustrate the mechanics of the pivoting transformation.
Figure 4D:
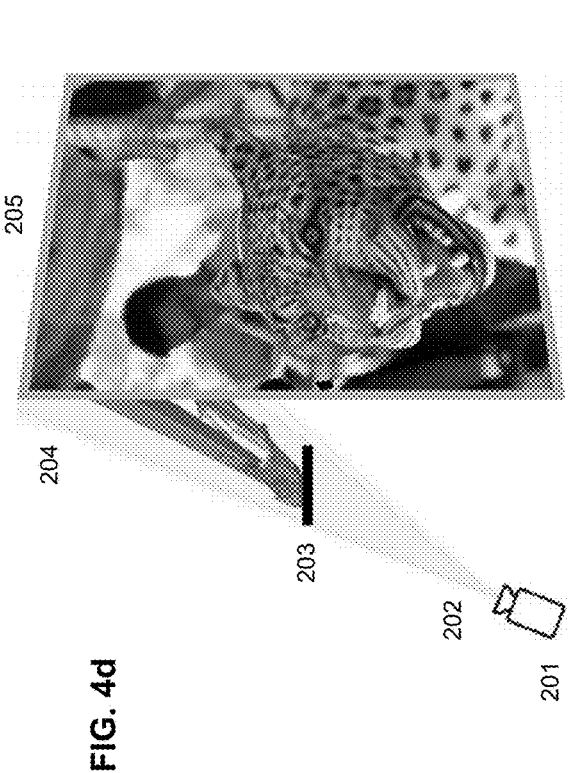
Figure 4A:
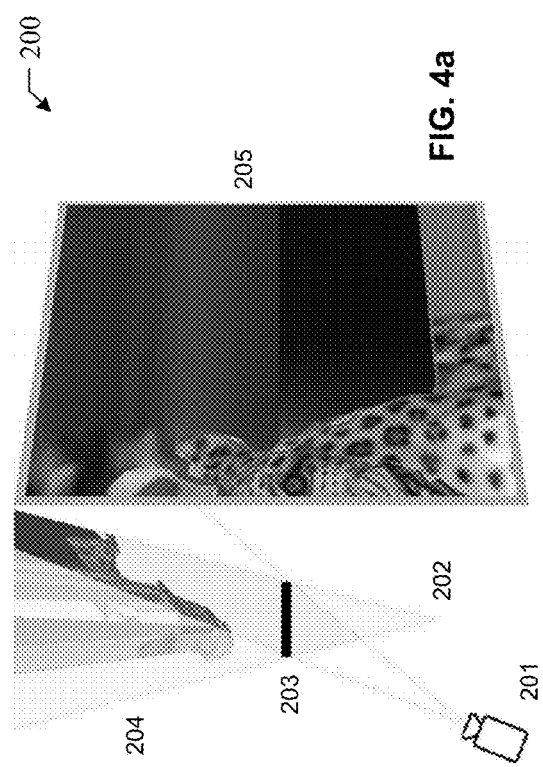

FIGS. 4a-4d illustrate the mechanics of the pivoting transformation. FIG. 4a illustrates an example VR 3D photo viewing experience 200 of a single 3D photo 204 without any transformation and the viewpoint 201 is substantially away from the OVP 202 and the image 205 seen by the user is of degraded quality. In particular embodiments, without transformation, even a modestly oblique angle of viewpoint 201 away from the OVP 202 may cause the 3D photo 204 to fall out of view, causing the image 205 to have degraded quality. In particular embodiments, to improve the quality of the image 205 seen by the viewer and the overall viewing experience, the pivoting transformation technique may be utilized where the intuitive idea is to transform each 3D photo 204 frustum using appropriate rotation, translation, and scaling so to move its OVP 202 closer to the current viewer position and effectively reduce and limit quality degradation. FIG. 4b illustrates the rotation step where the first step is to rotate the 3D photo 204 towards the viewer. Since VR produces two offset images, one for each eye, to enable binocular stereo, there are two views, a left and right view, and a reference point $c_p^{mid}$ is computed between the eyes, so a consistent rotation may be achieved, $$c_p^{mid} = \frac{1}{2}\left(c_p^{left} + c_p^{right}\right). \tag{6}$$

The 3D photo 204 may then be reoriented so that its tip points toward the reference point. Perpendicular direction vectors may then be computed, $$r^{forward} = \frac{f_p - c_p^{mid}}{\left\|f_p - c_p^{mid}\right\|}, \tag{7}$$

$$r^{right} = \frac{r^{forward} \times [0, 1, 0]^T}{\left\|r^{forward} \times [0, 1, 0]^T\right\|}, \tag{8}$$

$$r^{up} = -r^{forward} \times r^{right}, \tag{9}$$

and then stacked together into a rotation matrix:

$$R = \left[r^{right} | r^{up} | -r^{forward}\right]. \tag{10}$$

Figure 4C:
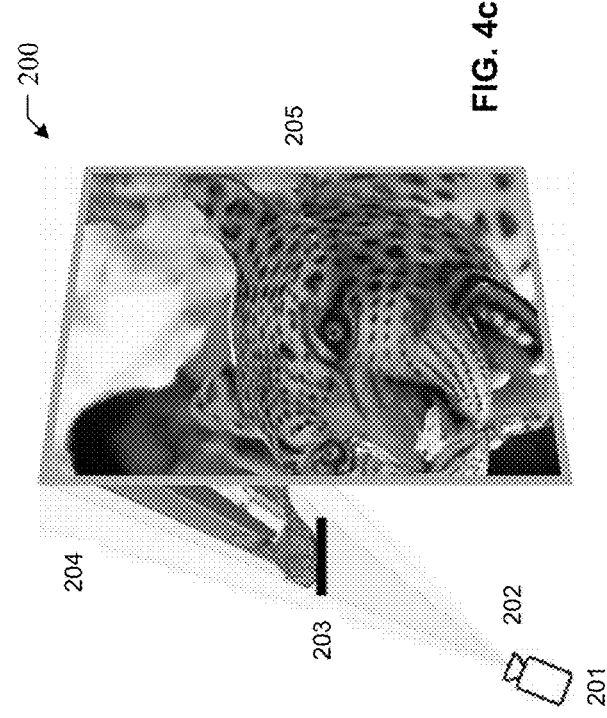

As an example and not by way of limitation, the reference point is a point between the eyes of the viewer located in the virtual space. In particular embodiment, a second image may be rendered comprising the adjusted plurality of 3D photos as seen through the plurality of frames, wherein the image and the second image are respectively rendered from a current left-eye viewpoint and a current right-eye viewpoint of the viewer. FIG. 4c illustrates the translation step. Rotating the 3D photo 204 moves the OVP 202 closer to the viewer and the viewpoint 201 and keeps its content in view. However, stepping back from or closer to the 3D photo 204 may also cause quality degradation. To further remedy degradation, the OVP 202 may be translated all the way to the reference point, which brings it as close as possible to both eye positions:

$$p = c_p^{mid}. \tag{11}$$

Note that translating the OVP 202 to the reference point, instead of the eye position, may preserve the full stereographic parallax. FIG. 4 illustrates the non-uniformed scaling step. The translated 3D photo 204 has a constant apparent screen size, which may seem unnatural when stepping back from or getting closer to the frame 203. The 3D photo may also get cropped, or out of bounds regions may become visible. The correct proportion may be recovered with reference to the frame 203 by non-uniformly scaling the 3D photo 204:

$$R = \left[s \cdot r^{right} | s \cdot r^{up} | -r^{forward}\right], \tag{12}$$

with the scale factor $$s = \frac{d_{fit}}{d_{actual}}, \tag{13}$$

where $$d_{actual} = \left\|f_p - c_p^{mid}\right\|. \tag{14}$$

One non-obvious problem which may present itself with this scheme is that the non-uniform scaling may affect the apparent interpupillary distance (IPD): the stereo parallax becomes larger when the 3D photo is scaled down and smaller when it is scaled up. This may be straining for the eyes and causes strong viewer discomfort, especially when the photos are scaled down. This may be compensated for by moving the photo position by an appropriate amount toward each eye position:

$$p = lerp(c_p, c_p^{mid}, s \cdot \lambda_{ipd}). \tag{15}$$

This may effectively bring the apparent IPD to its normal value for the photo's scale.

Figure 5:
FIG. 5 illustrates a transformed plurality of 3D photos.

FIG. 5 illustrates a transformed plurality of 3D photos. As an example and not by way of limitation the plurality of 3D photos have been pivoted by determining a reference point based on a head pose of a viewer within the virtual space, adjusting each 3D photo of the plurality of 3D photos by rotating the 3D photo so that the optimal viewing point of the 3D photo substantially points at the reference point, translating the rotated 3D photo toward the reference point, and non-uniformly scaling the rotated and translated 3D photo based on a scaling factor determined using the reference point and a position of the frame through which the 3D photo is to be viewed. In particular embodiments, the resulting images 205 appear to be viewed from optimal or near optimal viewpoint which coincides with the point of capture.

Figure 6B:
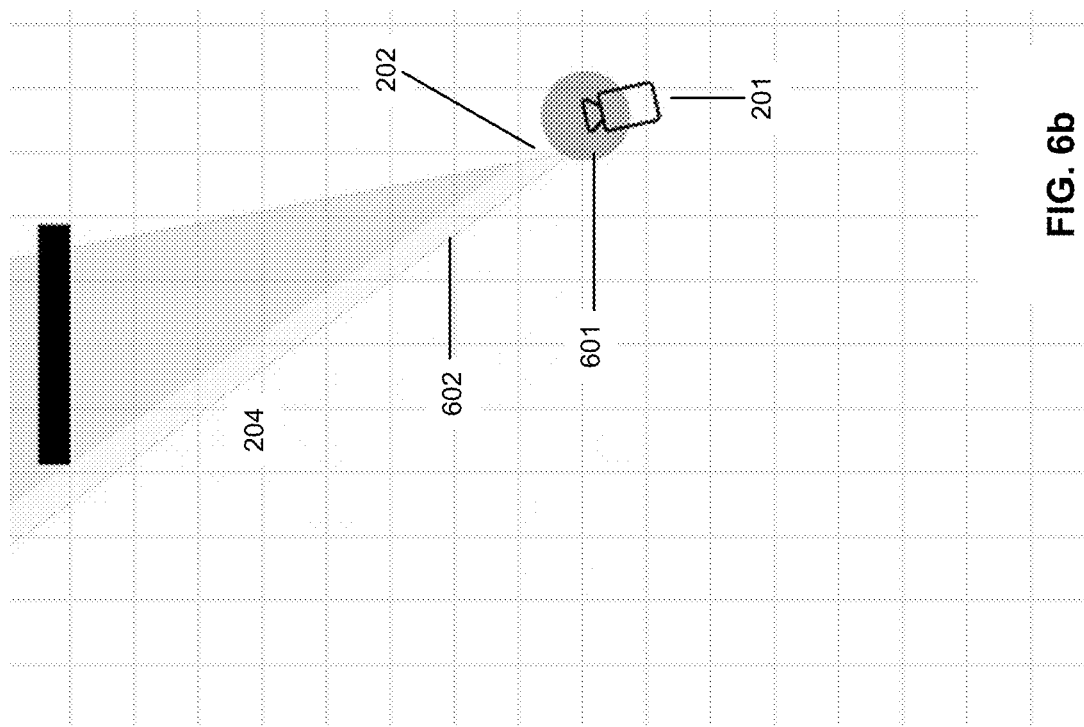
FIGS. 6a-6b illustrates head-motion parallax and the clamping region.
Figure 6A:
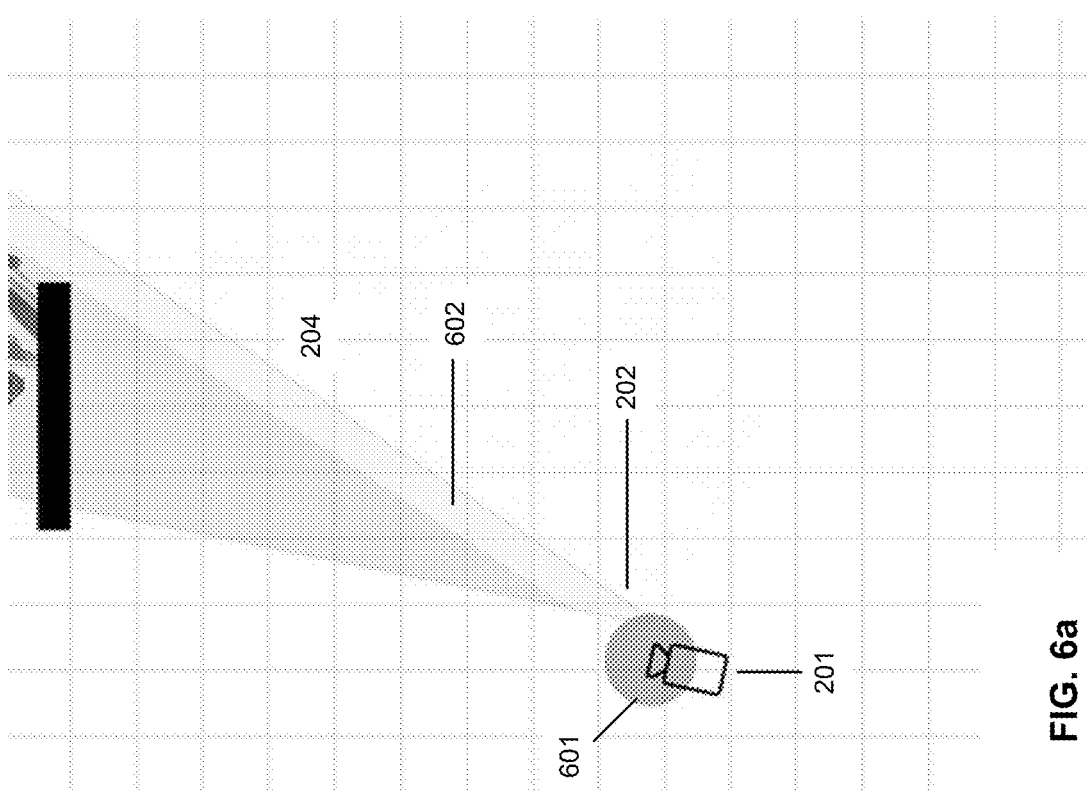

FIGS. 6a-6b illustrates head-motion parallax and the clamping region. FIG. 6a illustrates the utilization of head-motion parallax which may cause a delay 602. In the previous formulation the OVP 202 may perfectly track the viewer's position at the viewpoint 201. This may feel unnatural because the photo acts as if it is rigidly attached to the viewer. It may also completely remove head-motion parallax, which may be critical for depth perception in VR. This issue may be resolved by using hysteresis: instead of immediately tracking the viewpoint 201, the OVP 202 may react to any view change with an appropriate delay 602. This may provide head-motion parallax because the viewer can now step slightly away from the OVP 202 and see the correct off-angle view. At the same time the delayed tracking may prevent too large deviation from the OVP 202, and, hence, quality degradation. A key to achieving pleasing results may lie in selecting a good model for the hysteresis, and in shaping its behavior so it neither permits too large deviations nor reacts too abruptly to any slight head motion. A natural way to model hysteresis in a system is using a linear spring model from basic physics. Let x be the current value of some general quantity (e.g., a position or orientation). Let x̃ be the target value, so that x will approach I over time. In a linear spring model the deviation Δx=x̃−x decreases at a rate proportional to its value:

$$\frac{d\Delta x}{dt} = -kt. \tag{16}$$

Here, k is a stiffness coefficient that controls how fast x approaches its target value $\vec{x}$. Solving Equation (16) for x shows that the deviation vanishes with exponential decay:

$$x^{(t)} = x^{(0)} \exp(-kt). \tag{17}$$

Expressed in the context of a real-time graphics system, the following per-frame update rule may be obtained, $$x' = x + (\bar{x} - x)\exp(-k\Delta t), \tag{18}$$

where the current frame's value x' is derived from the previous frame's value x. At is the elapsed time since the last frame. One important advantage of modeling hysteresis in this way may be that the speed of adjustment is independent of the frame rate. The described spring model can be easily plugged into the formulation by applying it to each 3D photo's position p and rotation R. The 3D photo 204 transformations described above change the target values of these two quantities, while the current values may adjust over time. Note, quaternions may be used to represent rotations for the hysteresis calculations and re-normalize them after every update. When tuning the stiffness, however, one may find themselves in a dilemma: when the stiffness is high (adjusts quickly) the photo appears to be "swimming" because every slight viewer motion causes an immediate compensatory reaction; when the stiffness is low (adjusts slowly) the viewer can deviate too much from the OVP 202. It may be difficult to find a good balance between these conflicting constraints. In particular embodiments, the head pose of the viewer is measured with a predetermined delay period before being used for determining the reference point used for adjusting the 3D photo 204 or plurality of 3D photos. In other particular embodiments, the reference point is determined by applying a hysteresis model on a motion of the viewer. FIG. 6b illustrates the clamping region 601. Large deviations may be fixed by introducing a positional and rotational clamping region 601 around the viewer and preventing the current values from deviating outside this region. This may be done in a "soft" manner by rapidly increasing the spring stiffness once the viewer leaves the clamping region 601:

$$k_p = k_{normal} + k_{boost} \cdot \text{clamp}\left(\frac{\|\Delta p\|_2 - d_{max}}{d_{max}}, 0, 1\right), \tag{19}$$

$$k_R = k_{normal} + k_{boost} \cdot \text{clamp}\left(\frac{\alpha - \alpha_{max}}{\alpha_{max}}, 0, 1\right). \tag{20}$$

Here, α is the angle between the current and the target rotation:

$$\alpha = \measuredangle(\Delta R) = 2\cos^{-1}(\tilde{R} \cdot R). \tag{21}$$

This may provide a strong quality guarantee because the maximal deviation is now limited. In particular embodiments, the reference point may be maintained within a predetermined clamping region 601 around the head pose of the viewer in response to positional and rotational deviations by the viewer.

FIGS. 7a-7b illustrate the dead zone around the viewpoint. The other problem which may occur in having the spring always react even to slight head-motion is that it may create a swimming feeling which feels unnatural and as if the world is not stable. FIG. 7a illustrates a possible solution by introducing a dead zone 701 around the position and rotation target which is the viewpoint 201.

$$\tilde{p} = lerp\left(\tilde{p}, p, \min\left(1, \frac{d_{min}}{\|\Delta p\|_2}\right)\right), \tag{22}$$

-continued
$$\tilde{R} = slerp\left(\tilde{R}, R, \min\left(1, \frac{\alpha_{min}}{\alpha}\right)\right), \quad (23)$$

FIG. 7b further illustrates how slight deviations of the viewpoint 201 within the dead zone 701 does cause the image 205 to change. Put another way, as long as the viewer remains within the dead zone 701 the 3D photo 204 does not pivot at all. In particular embodiments, each of the plurality of 3D photos is adjusted in response to a determination that the head pose of the viewer is located beyond a threshold distance from the optimal viewing point 202 of the 3D photo 204. In another particular embodiment, the adjusted plurality of 3D photos may be stabilized by preventing further adjustments to the adjusted plurality of 3D photos in response to movements of the viewer within a predetermined zone around the reference point.

Figure 8:
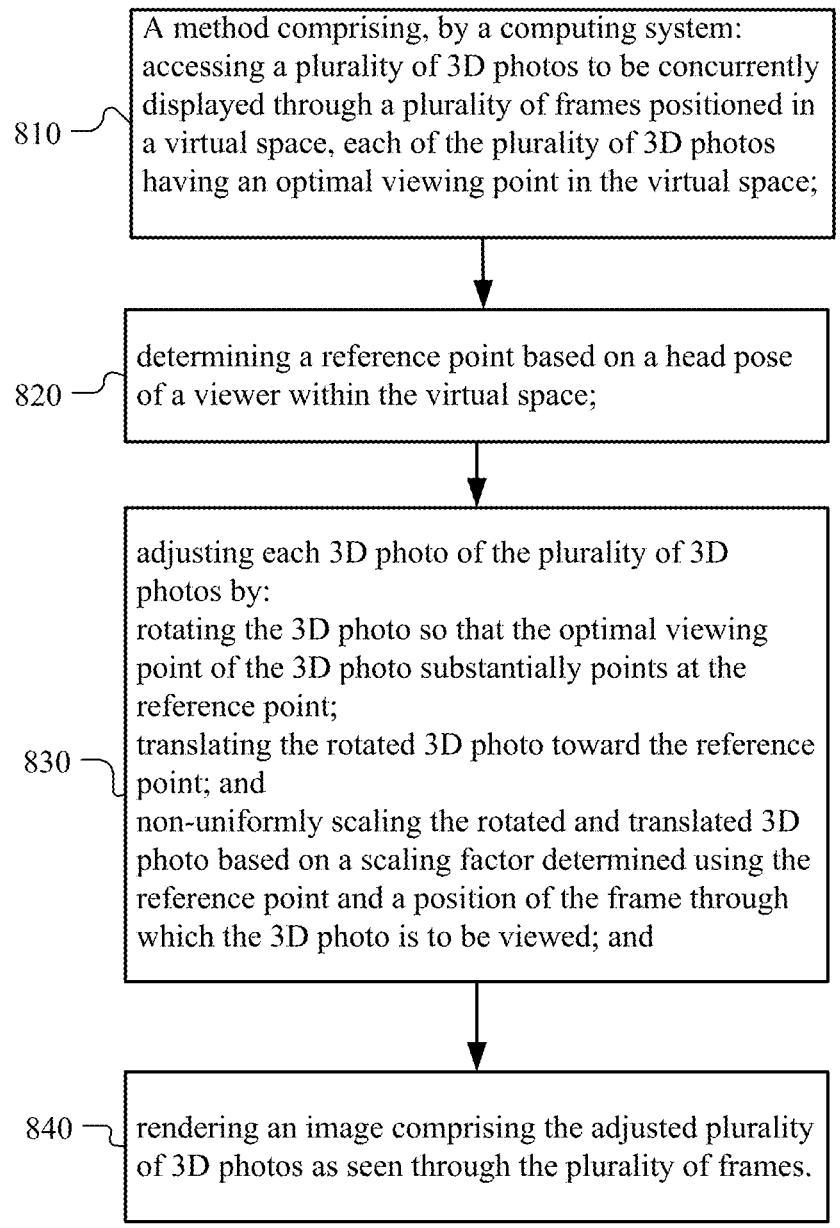
FIG. 8 illustrates an example method for transforming 3D photos.

FIG. 8 illustrates an example method 800 for transforming 3D photos. The method may be performed by a computing step at step 810, the computing system may access a plurality of 3D photos to be concurrently displayed through a plurality of frames positioned in a virtual space, each of the plurality of 3D photos having an optimal viewing point in the virtual space. At step 820, the computing system may determine a reference point based on a head pose of a viewer within the virtual space. At step 830, the computing system may adjust each 3D photo of the plurality of 3D photos by: rotating the 3D photo so that the optimal viewing point of the 3D photo substantially points at the reference point, translating the rotated 3D photo toward the reference point; and non-uniformly scaling the rotated and translated 3D photo based on a scaling factor determined using the reference point and a position of the frame through which the 3D photo is to be viewed. At step 840, the computing system may render an image comprising the adjusted plurality of 3D photos as seen through the plurality of frames. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for transforming 3D photos including the particular steps of the method of FIG. 8, this disclosure contemplates any suitable method for transforming 3D photos including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
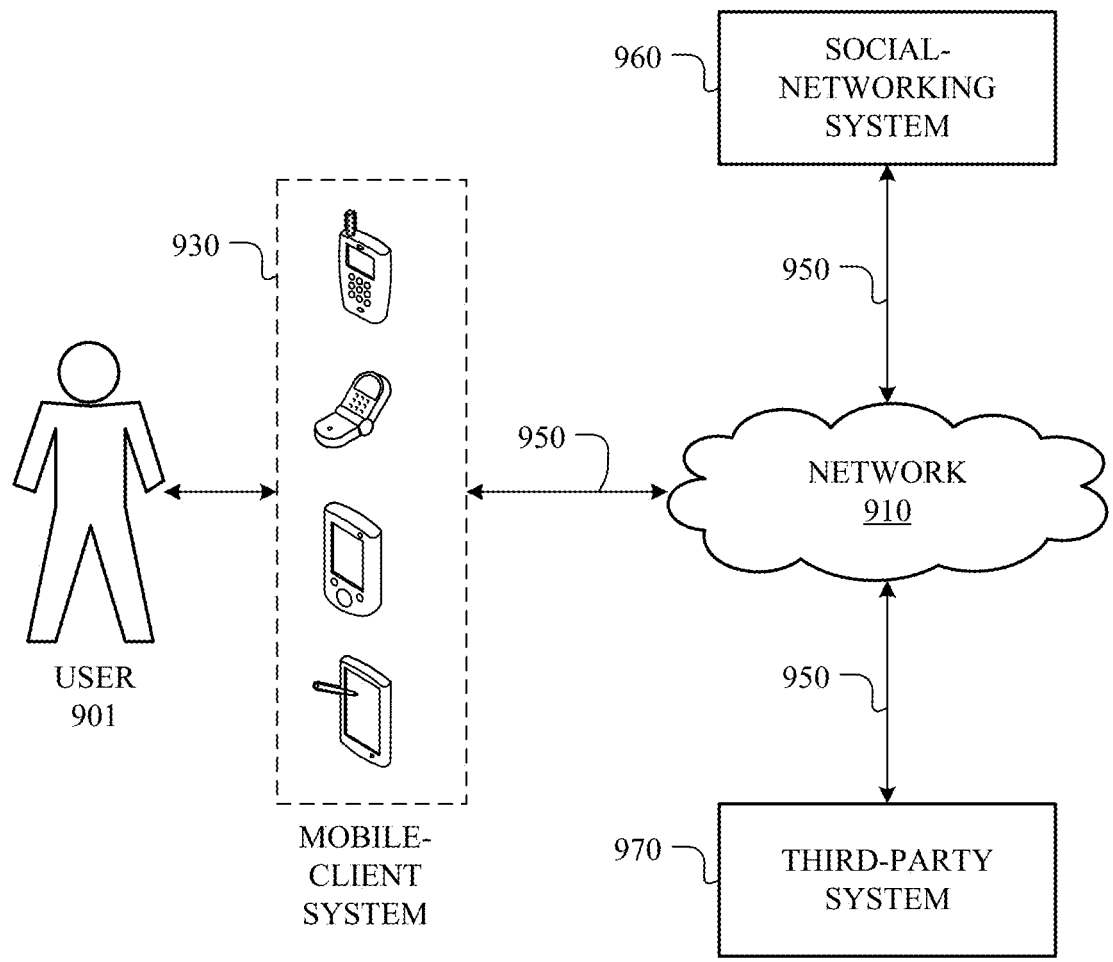
FIG. 9 illustrates an example network environment associated with a social-networking system.

FIG. 9 illustrates an example network environment 900 associated with a social-networking system. Network environment 900 includes a user 901, a client system 930, a social-networking system 960, and a third-party system 970 connected to each other by a network 910. Although FIG. 9 illustrates a particular arrangement of user 901 client system 930, social-networking system 960, third-party system 970, and network 910, this disclosure contemplates any suitable arrangement of user 901, client system 930, social-networking system 960, third-party system 970, and network 910. As an example and not by way of limitation, two or more of client system 930, social-networking system 960, and third-party system 970 may be connected to each other directly, bypassing network 910. As another example, two or more of client system 930, social-networking system 960, and third-party system 970 may be physically or logically co-located with each other in whole or in part. Moreover, although FIG. 9 illustrates a particular number of users 901, client systems 930, social-networking systems 960, third-party systems 970, and networks 910, this disclosure contemplates any suitable number of users 901, client systems 930, social-networking systems 960, third-party systems 970, and networks 910. As an example and not by way of limitation, network environment 900 may include multiple users 901, client system 930, social-networking systems 960, third-party systems 970, and networks 910.

In particular embodiments, user 901 may be an individual (human user), an entity (e.g., an enterprise, business, or third-party application), or a group (e.g., of individuals or entities) that interacts or communicates with or over social-networking system 960. In particular embodiments, social-networking system 960 may be a network-addressable computing system hosting an online social network. Social-networking system 960 may generate, store, receive, and send social-networking data, such as, for example, user-profile data, concept-profile data, social-graph information, or other suitable data related to the online social network. Social-networking system 960 may be accessed by the other components of network environment 900 either directly or via network 910. In particular embodiments, social-networking system 960 may include an authorization server (or other suitable component(s)) that allows users 901 to opt in to or opt out of having their actions logged by social-networking system 960 or shared with other systems (e.g., third-party systems 970), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 970 may be a network-address sable computing system that can host functionalities such as transforming 3D photos. Third-party system 970 may generate, store, receive, and send transforming 3D photos system data, such as, for example, the data required to transform 3D photos. Third-party system 970 may be accessed by the other components of network environment 900 either directly or via network 910. In particular embodiments, one or more users 901 may use one or more client systems 930 to access, send data to, and receive data from social-networking system 960 or third-party system 970. Client system 930 may access social-networking system 960 or third-party system 970 directly, via network 910, or via a third-party system. As an example and not by way of limitation, client system 930 may access third-party system 970 via social-networking system 960. Client system 930 may be any suitable computing device, such as, for example, a personal computer, a laptop computer, a cellular telephone, a smartphone, tablet computer, or an augmented/virtual reality device.

This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 may connect client system 930, social-networking system 960, and third-party system 970 to communication network 910 or to each other. This disclosure contemplates any suitable links 950. In particular embodiments, one or more links 950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout network environment 900. One or more first links 950 may differ in one or more respects from one or more second links 950.

Figure 10:
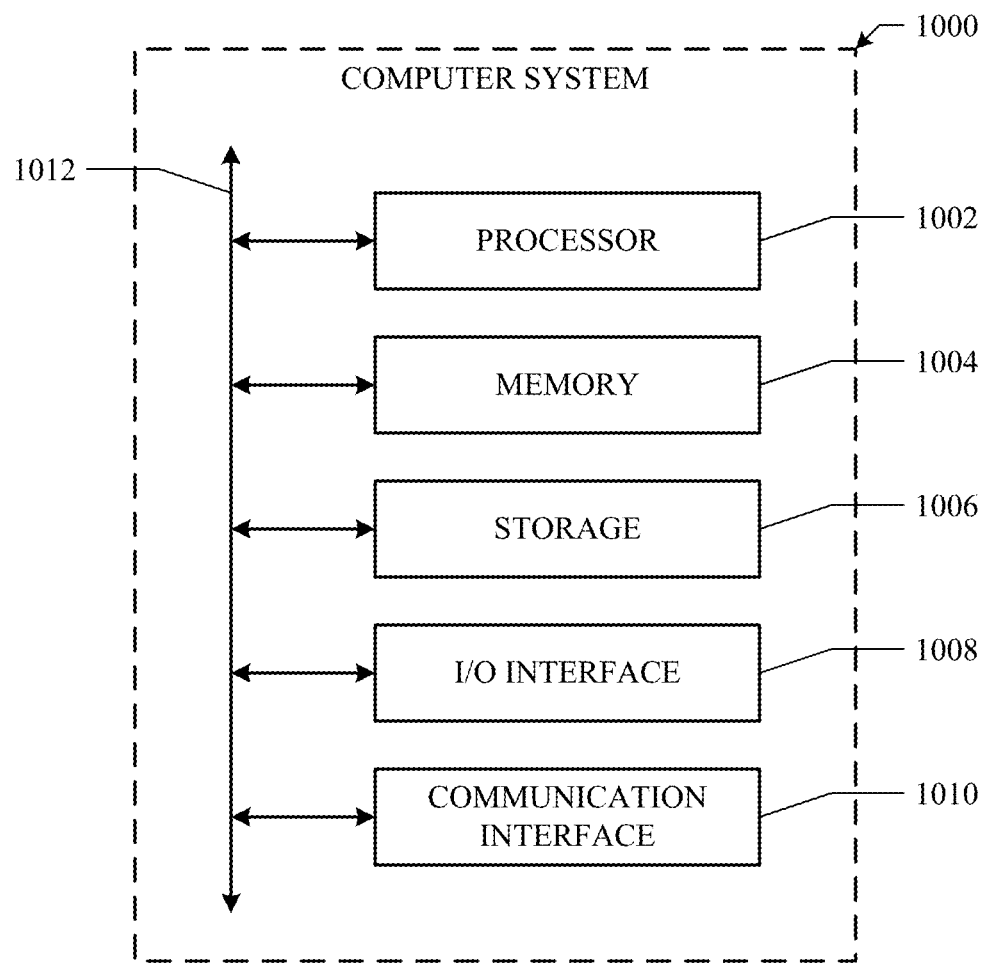
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    accessing a plurality of 3D photos to be concurrently and respectively displayed through a plurality of frames positioned in a virtual space, each of the plurality of 3D photos having an optimal viewing point in the virtual space;
    determining a reference point based on a head pose of a viewer within the virtual space;
    adjusting each 3D photo of the plurality of 3D photos, which is to be displayed through an associated frame of the plurality of frames, by:
        rotating the 3D photo so that the optimal viewing point of the 3D photo substantially points at the reference point;
        translating the rotated 3D photo toward the reference point; and
        non-uniformly scaling the rotated and translated 3D photo based on a scaling factor determined using the reference point and a position of the associated frame through which the 3D photo is to be viewed; and
    rendering an image comprising the adjusted plurality of 3D photos as seen through the plurality of frames.

2. The method of claim 1, wherein the reference point is a point between the eyes of the viewer located in the virtual space.

3. The method of claim 1, further comprising: rendering a second image comprising the adjusted plurality of 3D photos as seen through the plurality of frames, wherein the image and the second image are respectively rendered from a current left-eye viewpoint and a current right-eye viewpoint of the viewer.

4. The method of claim 1, wherein the optimal viewing point of each of the plurality of 3D photos is defined based on a location and an orientation of the 3D photo in the virtual space and a point of capture of the 3D photo.

5. The method of claim 1, wherein each 3D photo of the plurality of 3D photos has a different optimal viewing point in the virtual space.

6. The method of claim 1, wherein each of the plurality of 3D photos is adjusted in response to a determination that the head pose of the viewer is located beyond a threshold distance from the optimal viewing point of the 3D photo.

7. The method of claim 1, wherein the reference point is determined by applying a hysteresis model on a motion of the viewer.

8. The method of claim 1, further comprising: maintaining the reference point within a predetermined clamping region around the head pose of the viewer in response to positional and rotational deviations by the viewer.

9. The method of claim 1, further comprising: stabilizing the adjusted plurality of 3D photos by preventing further adjustments to the adjusted plurality of 3D photos in response to movements of the viewer within a predetermined zone around the reference point.

10. The method of claim 1, wherein rotating each of the plurality of 3D photos comprises:
    reorienting the 3D photo such that its optimal viewing point points substantially towards the reference point by:
        computing perpendicular direction vectors; and
        stacking the perpendicular direction vectors together in a rotation matrix.

11. One or more computer-readable non-transitory storage media embodying software that is operable when executed to:
    access a plurality of 3D photos to be concurrently and respectively displayed through a plurality of frames positioned in a virtual space, each of the plurality of 3D photos having an optimal viewing point in the virtual space;
    determine a reference point based on a head pose of a viewer within the virtual space;
    adjust each 3D photo of the plurality of 3D photos, which is to be displayed through an associated frame of the plurality of frames, by:
        rotating the 3D photo so that the optimal viewing point of the 3D photo substantially points at the reference point;
        translating the rotated 3D photo toward the reference point; and
        non-uniformly scaling the rotated and translated 3D photo based on a scaling factor determined using the reference point and a position of the associated frame through which the 3D photo is to be viewed; and
    rendering an image comprising the adjusted plurality of 3D photos as seen through the plurality of frames.

12. The media of claim 11, wherein the optimal viewing point of each of the plurality of 3D photos is defined based on a location and an orientation of the 3D photo in the virtual space and a point of capture of the 3D photo.

13. The media of claim 11, wherein each of the plurality of 3D photos is adjusted in response to a determination that the head pose of the viewer is located beyond a threshold distance from the optimal viewing point of the 3D photo.

14. The media of claim 11, further comprising: maintain the reference point within a predetermined clamping region around the head pose of the viewer in response to positional and rotational deviations by the viewer.

15. The media of claim 11, further comprising: stabilize the adjusted plurality of 3D photos by preventing further adjustments to the adjusted plurality of 3D photos in response to movements of the viewer within a predetermined zone around the reference point.

16. A system comprising:
one or more processors; and
one or more computer-readable non-transitory storage media coupled to one or more of the processors and comprising instructions operable when executed by one or more of the processors to cause the system to:
access a plurality of 3D photos to be concurrently and respectively displayed through a plurality of frames positioned in a virtual space, each of the plurality of 3D photos having an optimal viewing point in the virtual space;
determine a reference point based on a head pose of a viewer within the virtual space;
adjust each 3D photo of the plurality of 3D photos, which is to be displayed through an associated frame of the plurality of frames, by:
rotating the 3D photo so that the optimal viewing point of the 3D photo substantially points at the reference point;
translating the rotated 3D photo toward the reference point; and
non-uniformly scaling the rotated and translated 3D photo based on a scaling factor determined using the reference point and a position of the associated frame through which the 3D photo is to be viewed; and
rendering an image comprising the adjusted plurality of 3D photos as seen through the plurality of frames.

17. The system of claim 16, wherein the optimal viewing point of each of the plurality of 3D photos is defined based on a location and an orientation of the 3D photo in the virtual space and a point of capture of the 3D photo.

18. The system of claim 16, further comprising: maintain the reference point within a predetermined clamping region around the head pose of the viewer in response to positional and rotational deviations by the viewer.

19. The system of claim 16, further comprising: stabilize the adjusted plurality of 3D photos by preventing further adjustments to the adjusted plurality of 3D photos in response to movements of the viewer within a predetermined zone around the reference point.

20. The system of claim 16, wherein each 3D photo of the plurality of 3D photos has a different optimal viewing point in the virtual space.

* * * * *